US008007618B2

(12) United States Patent
Morizumi et al.

(10) Patent No.: US 8,007,618 B2
(45) Date of Patent: Aug. 30, 2011

(54) IMAGE DISPLAYING MEDIUM WITH METALLIC IMAGE AND THERMAL TRANSFER SHEET

(75) Inventors: Daigo Morizumi, Tokyo (JP); Masafumi Hayashi, Tokyo (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 198 days.

(21) Appl. No.: 12/400,950

(22) Filed: Mar. 10, 2009

(65) Prior Publication Data

US 2010/0089526 A1 Apr. 15, 2010

Related U.S. Application Data

(63) Continuation of application No. 10/386,340, filed on Mar. 11, 2003, now Pat. No. 7,521,102.

(30) Foreign Application Priority Data

Mar. 20, 2002 (JP) ................................ 2002-077475

(51) Int. Cl.

| | |
|---|---|
| ***B44C 1/165*** | (2006.01) |
| ***B32B 37/06*** | (2006.01) |
| ***B32B 37/14*** | (2006.01) |
| ***B32B 37/26*** | (2006.01) |
| *B44C 1/17* | (2006.01) |
| *B32B 27/00* | (2006.01) |

(52) U.S. Cl. ........ 156/240; 156/230; 156/237; 156/289; 428/32.52; 428/32.39; 428/32.69; 428/32.74; 428/32.77; 428/32.87

(58) Field of Classification Search ............... 428/32.52, 428/32.39, 32.5, 32.69, 32.74, 32.77, 32.87; 156/230, 233, 237, 239, 240, 289

See application file for complete search history.

(56) References Cited

U.S. PATENT DOCUMENTS

| | | | | |
|---|---|---|---|---|
| 4,868,049 | A * | 9/1989 | Nelson | 428/328 |
| 5,312,683 | A * | 5/1994 | Chou et al. | 428/32.74 |
| 5,643,639 | A * | 7/1997 | Rudder et al. | 427/577 |
| 5,643,659 | A * | 7/1997 | Kobayashi et al. | 428/32.75 |
| 6,043,191 | A * | 3/2000 | Imamura et al. | 503/204 |
| 6,524,760 | B1 * | 2/2003 | Ikeuchi et al. | 430/124.51 |
| 6,703,088 | B2 * | 3/2004 | Hayashi et al. | 428/32.74 |
| 6,861,125 | B1 * | 3/2005 | Carlson et al. | 428/195.1 |
| 6,998,213 | B2 * | 2/2006 | Aso et al. | 430/126.1 |
| 2001/0004509 | A1 * | 6/2001 | Hayashi | 430/200 |
| 2002/0061391 | A1 * | 5/2002 | Hayashi et al. | 428/209 |

FOREIGN PATENT DOCUMENTS

| | | | |
|---|---|---|---|
| EP | 0 685 346 | A1 | 12/1995 |
| JP | 07-314915 | A | 12/1995 |
| JP | 07314915 | A * | 12/1995 |

OTHER PUBLICATIONS

List of Organic Solvent Soluble Copolyester: Vylon Product Information—retrieved Mar. 17, 2008.*

* cited by examiner

*Primary Examiner* — Sonya Mazumdar
(74) *Attorney, Agent, or Firm* — Ladas & Parry LLP

(57) ABSTRACT

The present invention provides an image displaying medium with a metallic image, which comprises a metallic image formed on a transfer receiving material with a color image formed thereon, wherein the metallic image is formed by using a thermal transfer sheet in which at least a resinous peelable layer and a metal thin layer are provided on one surface of a substrate film in this order, the resinous peelable layer comprising a pigment and a thermoplastic resin having a glass transition temperature of 60° C. or higher and the metal thin layer comprising a composition containing an aluminum pigment prepared by forming an aluminum film by deposition on a carrier sheet with a releasing layer provided thereon, and peeling the aluminum film from the carrier sheet to finely divide it, and a binder of a thermoplastic resin having a glass transition temperature of 50 to 150° C., and the 60°, 45°, 20° specular reflection of the image surface on which the metallic image is formed is 100% or greater, and a brightness (L*value) is 20 or greater.

10 Claims, No Drawings

IMAGE DISPLAYING MEDIUM WITH METALLIC IMAGE AND THERMAL TRANSFER SHEET

The present application is a continuation of U.S. application Ser. No. 10/386,340, now U.S. Pat. No. 7,521,102 filed Mar. 11, 2003, and claims priority from Japanese Application Number 2002-077475 filed Mar. 20, 2002, the disclosures of which are hereby incorporated by reference herein in their entirety.

BACKGROUND OF THE INVENTION

1) Field of the Invention

The present invention relates to a thermal transfer sheet used in a thermal transfer printer using heating means of a thermal head, more particularly, to an image displaying medium having an on-demand metallic color having a high luminance and a high brightness, and a thermal transfer sheet from which the image displaying medium can be simply obtained.

2) Description of the Related Art

Previously, non-impact printing has been outputting letters, symbols and photographic images on a plain paper or a recording sheet having a plastic substrate by electrophotographic copying, ink jet recording, thermal transfer recording such as melting transfer recording and sublimation transfer recording, heat sensitive developing recording or the like, and has been widely used as a hard copy. In addition, as a method of obtaining a printed product having the metal luster, a screen printing method using an ink containing a metal pigment, a putting leaf method using a metal transfer foil, a thermal transfer system using a thermal head with a metal-deposited ribbon and the like are practically used. Inter alia, as a method for preparing an on-demand metallic colored printed product, a thermal transfer system is excellent, and a variety of applications are being deployed.

However, in order to obtain a printed product having a metallic color image having a high luminance and a high brightness, matching of the surface property of a transfer receiving material, a substrate, a printing method, a printing condition, a layer structure of a thermal transfer sheet and the like is necessary and, depending on a combination thereof, a luminance is lowered, a printed product looks dark depending on visual angle and, thus there is a problem that appearance of design is not necessarily satisfied.

SUMMARY OF THE INVENTION

Therefore, in order to solve the aforementioned problems, an object of the present invention is to provide an image displaying medium having an on-demand metallic color image having a high luminance and a high brightness, and a thermal transfer sheet from which the image displaying medium can be simply obtained.

In order to attain the aforementioned object, an image displaying medium according to the present invention is an image displaying medium with a metallic image, which comprises a metallic image formed on a transfer receiving material with a color image formed thereon, wherein the metallic image is formed by using a thermal transfer sheet in which at least a resinous peelable layer and a metal thin layer are provided on one surface of a substrate film in this order, the resinous peelable layer comprising a pigment and a thermoplastic resin having a glass transition temperature of 60° C. or higher and the metal thin layer comprising a composition containing an aluminum pigment prepared by forming an aluminum film by deposition on a carrier sheet with a releasing layer provided thereon, and peeling the aluminum film from the carrier sheet to finely divide it, and a binder of a thermoplastic resin having a glass transition temperature of 50 to 150° C., and the 60°, 45°, 20° specular reflection of the image surface on which the metallic image is formed is 100% or greater according to JIS Z8741, and a brightness (L*value) is 20 or greater.

In addition, the thermal transfer sheet is further provided with a heat resistant layer formed on the other surface.

Moreover, the image displaying medium is such that the 60°, 45°, 20° specular reflection of the surface of the transfer receiving material is 30% or greater.

The image displaying medium is such that a protecting layer is further provided on the transfer receiving material with a color image formed thereon, and the protecting layer is formed by thermally transferring a heat sensitive transferring transparent resin layer comprising a thermoplastic resin having a glass transition temperature of 60 to 150° C. onto the whole image from a thermal transfer sheet in which the heat sensitive transferring transparent resin layer is originally provided on at least one surface of a substrate.

According to one aspect, the transfer receiving material with a color image formed thereon is produced from a thermal transfer image-receiving sheet in which a receiving layer is provided on at least one surface of a substrate, and the color image of the transfer receiving material is formed by selectively and thermally transferring a heat sensitive transferring ink onto the receiving layer of the thermal transfer image-receiving sheet, from a thermal transfer sheet having a heat sensitive transferring ink layer on at least one surface of a substrate film.

According to another aspect, the transfer receiving material with a color image formed thereon is produced from a heat sensitive recording medium in which a heat sensitive developing layer (a heat sensitive color-developing layer) is provided on a substrate, and the color image of the transfer receiving material is formed by selectively and heat sensitively developing a heat sensitive recording medium.

According to another aspect, the transfer receiving material with a color image formed thereon is produced from an ink jet image-receiving sheet in which an aqueous ink receiving layer is provided on at least one surface of a substrate, and the color image of the transfer receiving material is formed by selectively jetting an aqueous ink to the aqueous ink receiving layer of the ink jet image-receiving sheet.

According to another aspect, the transfer receiving material with a color image formed thereon is produced by forming the color image on at least one surface of a substrate by a silver salt photographic system.

According to still another aspect, the transfer receiving material with a color image formed thereon is produced from an electrophotographic image-receiving sheet in which a receiving layer having the toner fixing property, and the color image of the transfer receiving material is formed by selectively transfer a toner to the receiving layer of an electrophotographic image-receiving sheet, followed by fixing.

According to another aspect, the transfer receiving material with a color image formed thereon is a pressure-sensitive adhesive label in which a pressure-sensitive adhesive layer and a release sheet are successively provided on the surface opposite to a surface on which a color image is formed.

Also, the thermal transfer sheet according to the present invention is a thermal transfer sheet comprising a resinous peelable layer and a metal thin layer provided on one surface of a substrate film in this order, wherein the resinous peelable layer comprises a pigment and a thermoplastic resin having a glass transition temperature of 60° C. or higher and the metal thin layer comprises a composition containing an aluminum pigment prepared by forming an aluminum film by deposition on a carrier sheet with a releasing layer provided thereon, and peeling the aluminum film from the carrier sheet to finely divide it, and a binder of a thermoplastic resin having a glass transition temperature of 50 to 150° C.

The action of the present invention is as follows:

According to the image displaying medium with a metallic image of the present invention, which comprises a metallic image formed on a transfer receiving material with a color image formed thereon, wherein the metallic image is formed by using a thermal transfer sheet in which at least a resinous peelable layer and a metal thin layer are laminated on one surface of a substrate film in this order, the resinous peelable layer mainly containing at least a pigment and a thermoplastic resin having a glass transition temperature of 60° C. or higher and the metal thin layer formed from a composition mainly containing an aluminum pigment prepared by forming an aluminum film by deposition on a carrier sheet with a releasing layer provided thereon, and peeling the aluminum film from the carrier sheet to finely divide it, and a binder of a thermoplastic resin having a glass transition temperature of 50 to 150° C., and the 60°, 45°, 20° specular reflection of the image surface on which the metallic image is formed is 100% or greater according to JIS Z8741, the Japanese Industrial Standard that specifies the methods of measurement for specular glossiness of the macroscopically smooth surface of products of mining and manufacturing industry, incorporated herein by reference, and a brightness (L*value) is 20 or greater, whereby, a printed product is obtained which has an on-demand metallic color image having a high luminance and a high brightness and the excellent abrasive resistance.

DETAILED DESCRIPTION OF THE INVENTION

Then, embodiment of the invention will be described in detail.

As a thermal transfer recording material for preparing an image displaying medium with a metallic image in the present invention, a thermal transfer sheet in which at least a resinous peelable layer mainly containing a pigment and a thermoplastic resin having a glass transition temperature of 60° C. or higher, and a metal thin layer are provided on one surface of a substrate film in this order, and a transfer receiving material on which a color image is formed are used. This thermal transfer sheet is for forming a metallic image on a transfer receiving material. Further, the image displaying medium with a metallic image of the present invention is transferred a resinous peelable layer and a metal thin layer in the form of an image onto a transfer receiving material on which a color image is formed in advance, by heating the thermal transfer sheet of the above-mentioned thermal transfer recording material in the form of an image, whereby, a metallic image is formed.

The 60°, 45°, 20° specular reflection of the surface of an image on which the metallic image is formed is 100% or greater according to JIS Z8741, and a brightness (L*value) of the surface is 20 or greater.

It is desirable that the thermal transfer sheet is further provided with a heat resistant layer formed on the other surface.

It is desirable that the 60°, 45°, 20° specular reflection of the surface of the transfer receiving material is 100% or greater.

In addition, a protecting layer can be further provided on the transfer receiving material with a color image formed thereon, and the protecting layer is formed by thermally transferring a heat sensitive transferring transparent layer mainly containing a thermoplastic resin having a glass transition temperature of 60 to 150° C. onto the whole image from a thermal transfer sheet in which the heat sensitive transferring transparent resin layer is originally provided on at least one surface of a substrate.

Further, the transfer receiving material with a color image formed thereon may be a pressure-sensitive adhesive type in which a pressure-sensitive adhesive layer and a release sheet are successively provided on a surface opposite to a surface on which a color image is provided.

First, a thermal transfer sheet in which at least a resinous peelable layer mainly containing a pigment and a thermoplastic resin having a glass transition temperature of 60° C. or higher, and a metal thin layer are laminated on one surface of a substrate film in this order will be explained below.

(Substrate Film)

As a substrate film of a thermal transfer sheet used in the present invention, the same substrate films as those used for the previous thermal transfer sheets can be used as they are and, at the same time, others may be used, and there is no particular limitation to the type of substrate film.

Examples of preferable substrate films include plastic films such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resin, chlorinated rubber, ionomer and the like, papers such as condenser paper, paraffin paper and the like, unwoven fabric and the like, and a composite film composed of those films can be used as the substrate films. A particularly preferable substrate film is a polyethylene terephthalate film. A thickness of this substrate film can be appropriately changed depending on a material so that a strength and a thermal conductivity thereof become suitable, and the thickness is preferable, for example, 2 to 25 μm.

(Resinous Peelable Layer)

A resinous peelable layer formed on one surface of the substrate film improves the peelability of a metal thin layer from the substrate film at thermal transference, and a part thereof together with a metal thin layer is transferred onto the surface of a transferred image.

Therefore, since a resinous peelable layer is situated on a metal thin layer in the state of a transferred image, it has a transparency to an extent that the metal luster of a metal thin layer can be seen therethrough, and the metal luster is not deteriorated.

For the purpose of improving coloring and a brightness of a metallic color, coloring materials of cyan, magenta, yellow, black and other colors derived from the known pigments can be mixed into a resinous peelable layer to an extent that the transparency of the resinous peelable layer is not deteriorated. As the pigments, the known organic or inorganic pigments can be used. Examples of a black colorant include inorganic carbon black, graphite, tri-iron tetroxide, and organic cyanine black and the like. Examples of a yellow pigment include inorganic chrome yellow, cadmium yellow, yellow iron oxide, titan yellow and the like. As organic pigments, examples of a monoazo pigment include Pigment Yellow 1, 3, 65, 74, 98, 97, 13 and 169, examples of a dis-azo pigment include Pigment Yellow 12, 13, 14, 17, 55, 83 and the like, examples of a fused azo pigment include Pigment Yellow 93, 94, 95 and the like, and examples of a benzimidazolone monoazo pigment include Pigment Yellow 154, 151, 120, 175, 156 and the like. Moreover, examples of an isoindolinone pigment include Pigment Yellow 110, 109, 137, 173 and the like. Other examples include styrene pigments such as flavanthrone (Pigment Yellow 24), anthramilimidine (Pigment Yellow 108), phthaloylamide-type anthraquinone (Pigment Yellow 123), Helio Fast Yellow (Pigment Yellow 99), azo nickel complex pigment which is a metal complex pigment (Pigment Green 10), nitroso nickel pigment (Pigment Yellow 153), azomethine copper complex pigment (Pigment Yellow 117), and phthalimidoquinophthalone pigment which is a quinophthalone pigment (Pigment Yellow 138) and the like.

Examples of a magenta pigment include inorganic pigments such as cadmium red, red iron oxide, vermilion, red lead, red antimony and the like. Examples of organic pigments include azo pigments such as Pigment Red 57, 57:1, 53:1, 48, 49, 60, 64, 51 and 63, Pigment Orange 17, 18 and the like, insoluble azo pigments (monoazo, dis-azo, fused azo) such as Pigment Red 1, 2, 3, 9, 112, 114, 5, 150, 146, 170, 187, 185, 38, 166, 144, Pigment Orange 5, 31, 38, 36, 16, 13 and the like. Examples of an anthraquinone pigment which is a fused polycyclic pigment include Pigment Orange 40 and 168, Pigment Red 177, and the like. Examples of a thioindigo pigment include Pigment Violet 38 and 36, Pigment Red 88, and the like. Further, examples of a perylene pigment include Pigment Red 190, 123, 179, 149, 178 and the like. Examples of a quinacridone pigment include Pigment Red 122, 206 and 207, Pigment Violet 19, and the like. Examples of a cyan pigment include inorganic ultramarine, Prussian blue, cobalt blue, cerulean blue and the like. Examples of organic pigments include phthalocyanine pigment such as Pigment Blue 15, 15:1, 15:3 and 17, Pigment Green 7 and 36, Pigment Violet 23, and the like. In addition, indanthrone blue which is a styrene pigment (PB-60p, PB-22, PB-21, PB-64), basic die lake pigment may be used. These pigments can be used by mixing two or more kinds of them.

A mixing ratio of a pigment is preferably in a range of 1 to 50 parts by weight, particularly preferably in a range of 5 to 30 parts by weight in terms of weight ratio letting a thermoplastic resin solid content to be 100. Although there is a difference depending on a pigment used, when an amount of a pigment is too small, a brightness is reduced, while when an amount of a pigment is too large, the metallic feeling is reduced due to light scattering and adsorption by a pigment.

As a thermoplastic resin, specifically, a thermoplastic resin having a glass transition temperature of 60° C. or higher can be primarily used, and examples thereof include an acrylic resin, a vinyl chloride-vinyl acetate copolymer resin, a polyester resin, a polyolefin resin, a polyvinyl acetal resin, a polyvinyl butyral resin, a polyethylene resin, a polycarbonate resin, a polyarylate resin, a polystyrene resin, a styrene-acrylic copolymer resin, a cellulose resin, a polyvinyl alcohol resin, a polyamide resin, a polyimide resin, and a norbornene resin, and a mixture, a copolymer, a modified material of exemplified resins.

Inter alia, an acrylic resin, a polyolefin resin, a vinyl chloride-vinyl acetate copolymer resin, and a polyester resin, and a mixture thereof are preferable from a viewpoint of the heat resistance, the transparency, the releasability from a substrate film side, and the sharpness of a boundary where transfer is stopped at printing.

A thickness of a resinous peelable layer is usually in a range of around 0.1 to 5.0 g/m$^2$, preferably 0.3 to 1.0 g/m$^2$ in terms of a coating amount of solids. For example, when a thickness is less than 0.1 g/m$^2$, the peeling function as a peelable layer is not stabilized, while when a thickness exceeds 5.0 g/m$^2$, the sharpness of a boundary where transfer is stopped at printing is deteriorated, and recording of half tone becomes difficult.

(Metal Thin Layer)

A metal thin layer is transferred from a thermal transfer sheet onto a transfer receiving material to give the excellent metal luster of a metallic image to the transfer receiving material:

This metal thin layer can be formed by a coating layer in which an aluminum pigment is dispersed in a binder.

When a metal thin layer is formed by dispersing a metal pigment in a binder and coating the dispersion, main components of the metal thin layer are a binder comprising a resin and a wax or a mixture thereof, and a metal pigment which is a powder of a metal or an alloy comprising such as gold, silver, copper, aluminum, chromium and the like. Examples of a resin used in a binder include a polyolefin resin such as a vinyl chloride-vinyl acetate copolymer, an ethylene-vinyl acetate copolymer, an ethylene-acrylic acid copolymer and the like, a polyamide resin, a polyester resin, an epoxy resin, a polyurethane resin, an acrylic resin, a polyvinyl chloride resin, a polyvinyl acetate resin, a petroleum resin, a phenol resin, a polystyrene resin and the like. Examples of a wax used in a binder include various waxes such as microcrystalline wax, carnauba wax, paraffin fax, Fisher-Tropsh wax, various low-molecular polyethylene, haze wax, beeswax, spermaceti wax, insect wax, wool wax, shellac wax, candelilla wax, petrolatum, partially denatured wax, fatty acid ester, fatty acid amide and the like.

Among the above-mentioned binders, it is preferable to use a binder corresponding to a thermoplastic resin having a glass transition temperature of 50 to 150° C. from a viewpoint of the excellent transfer property, the film strength and the like of metal thin layer.

As a metal pigment, an aluminum pigment is preferable from a viewpoint of the color tone and the luster. In addition, it is particularly preferable to use the aluminum pigment prepared by forming an aluminum film by deposition on a carrier sheet with a releasing layer provided thereon, and peeling the aluminum film from the carrier sheet to finely divide it because it is excellent in the metal luster and is excellent in formation of an image having a high brightness. The thus-prepared aluminum pigment is scale-like, deposited thickness thereof is around 0.01 to 0.1 μm, an average particle thickness (short diameter) thereof is 0.01 to 0.2 μm, an average diameter (long diameter) thereof is around 1 to 100 μm, and the surface thereof may be treated with a resin or the like. Since a scale-like aluminum pigment prepared by the above-mentioned process has the superior luster of the surface of an aluminum pigment equivalent to that of an aluminum deposited film as compared with the previous aluminum paste, a luminance near that of an aluminum deposited film is obtained in the case of using the scale-like aluminum pigment. Further, since the film prepared by using the scale-like aluminum pigment has a discontinuous phase between pigments, it has the light random reflecting property as compared with a deposited film which is a continuous phase, and it becomes possible to impart brightness.

In addition, a particle diameter and an amount to be added of these metal pigments can be arbitrarily selected depending on the opacifying property, the transfer sensitivity, the luminance and the like of a printed image. As an average particle diameter of a metal pigment grows larger, the luminance is increased, but the transfer property is reduced. Conversely, when an average particle diameter grows smaller, there is a problem that printing at the low energy becomes possible but the luminance is reduced.

Therefore, an average particle diameter of metal pigments is preferably 1 to 100 μm, particularly preferably 1 to 50 μm. When the diameter is less 1 μm, there is a problem of reduction in the luminance, while when the diameter is above 100 μm, the transfer property is reduced. The content of metal pigments in a metal thin layer is preferably 10 to 500 parts by weight, particularly preferably 25 to 200 parts by weight relative to 100 parts by weight of a binder. When the content is less than 10 parts, it is necessary to increase a thickness in order to maintain the opacifying property, and there arises a problem that the sharpness of a boundary where transfer is stopped at printing, and the transfer sensitivity are deteriorated. When the content exceeds 500 parts, there arises a problem that the fixing property onto a transfer receiving paper is reduced.

In addition, a metal pigment and a binder, if necessary, and an additive such as a dispersing agent, a settling preventing agent and the like may be added to a metal thin layer. By adding these materials, the dispersibility of a metal pigment in a metal thin layer is improved, and the luminance of a printed product can be efficiently improved. Formation of a metal thin layer can be conducted using the above-mentioned metal thin layer composition by hot melt coating, hot lacquer coating, gravure direct coating, gravure reverse coating, knife coating, air coating, and roll coating methods and the like. A thickness of a metal thin layer can be arbitrarily selected in view of the opacifying property and the transfer sensitivity, and is 0.1 to 5.0 g/m$^2$, particularly preferably 0.2 to 2.0 g/m$^2$. When the thickness is less than 0.1 g/m$^2$, there is a problem of reduction in the opacifying property, while when the thickness is above 5.0 g/m$^2$, there is a problem of reduction in the transfer sensitivity and the sharpness of a boundary where transfer is stopped.

The thermal transfer sheet of the present invention has a construction that a resinous peelable layer containing mainly at least a pigment and a thermoplastic resin having a glass transition temperature of 60° C. or higher, and a metal thin layer are formed on one surface of the substrate film in this order, and the metal thin layer comprises a composition mainly containing an aluminum pigment prepared by forming an aluminum film by deposition on a carrier sheet with a releasing layer provided thereon, and peeling the aluminum film from the carrier sheet to finely divide it, and a binder of a thermoplastic resin having a glass transition temperature of 50 to 150° C. In the image displaying medium of the present invention, by using this thermal transfer sheet and transferring a metal thin layer together with a resinous peelable layer onto a transfer receiving material, a metallic image is formed on the transfer receiving material, the 60°, 45°, 20° specular reflection of the surface of the image is 100% or greater according to JIS Z8741, and a brightness (L*value) is set at 20 or greater.

By providing an adhesive layer on a metal thin layer of the above-explained thermal transfer sheet, the transfer sensitivity onto a transfer receiving material and the adhesiveness onto a transfer receiving material can be improved.

The adhesive layer is composed of the previously known various thermoplastic resins as a main component.

Examples of a thermoplastic resin include an ethylene-vinyl acetate copolymer (EVA), an ethylene-acrylic acid ester copolymer (EEA), a polyester resin, polyethylene, polystyrene, polypropylene, polybutene, a petroleum resin, a vinyl chloride resin, a vinyl chloride-vinyl acetate copolymer, polyvinyl butyral, polyvinyl acetate, and a modification and a mixture thereof. In particular, thermoplastic resins having a glass transition temperature of 60 to 150° C. which have previously been used as a heat sensitive adhesive are preferable.

In addition, in order to enhance the transfer sensitivity, a wax component as described above may be added to the adhesive layer in such a range that the adhesiveness to a transfer receiving material is not remarkably reduced. In addition, in order to prevent blocking when the resulting thermal transfer sheet is wound roll-like, antiblocking agents such as waxes, higher fatty acid amide, ester and salt, fluorine resin and inorganic material powder may be added.

The adhesive layer is formed by hot melt-coating the aforementioned thermoplastic resin and additive, or by coating an adhesive layer-forming coating solution in which the thermoplastic resin and the additive are dissolved or dispersed in a suitable organic solvent or water by the previously known hot melt coating, hot lacquer coating, gravure direct coating, gravure reverse coating, knife coating, air coating, and roll coating methods, at a thickness in the dry state of 0.05 to 5.0 g/m$^2$, particularly preferably 0.10 to 2.0 g/m$^2$.

When a thickness of a dried coating is less than 0.05 g/m$^2$, the effect of improvement in the transfer sensitivity and the adhesiveness onto a transfer receiving material is hardly obtained. In addition, when the thickness exceeds 5.0 g/m$^2$, the transfer sensitivity and the sharpness of a boundary where the transfer is stopped at printing are reduced and, thus, the satisfactory printing quality can not be obtained.

(Heat Resistant Layer)

In addition, in the present invention, it is preferable that, in order to improve the lubricity of a thermal head and prevent sticking, a heat resistant layer is further provided on the surface of a side brought into contact with a thermal head, of a substrate film. The heat resistant layer contains, as a fundamental component, a resin having the heat resistance, and a material which acts as a thermal releasing agent or a lubricant.

By provision of such the heat resistant layer, also in a thermal transfer sheet having a plastic film having the low heat resistant as a substrate, it is possible to perform thermal printing without causing sticking, and merits of a plastic film for the substrate film such as unbreakability and easy processibility can be utilized.

This heat resistant layer is formed by using a composition which add a lubricant, a surfactant, an inorganic particle, an organic particle, a pigment and the like to a binder resin preferably.

Examples of a binder resin used in the heat resistant layer include cellulose resins such as ethylcellulose, hydroxyethylcellulose, hydroxypropylcellulose, methylcellulose, cellulose acetate, cellulose acetate butyrate and cellulose nitrate, vinyl resins such as polyvinyl alcohol, polyvinyl acetate, polyvinyl butyral, polyvinyl acetal, polyvinyl pyrrolidone, acrylic resin, polyacrylamide and acrylonitrile-styrene copolymer, and polyester resin, polyurethane resin, and silicone-modified or fluorine-modified urethane resin and the like.

Among them, it is preferable to use a cross-linking resin by incorporating a cross-linking agent such as polyisocyanate into a resin having several reactive groups, for example, a hydroxyl group.

The heat resistant layer is formed by preparing a coating solution by dissolving or dispersing a material containing the above-mentioned binder resin with a lubricant, a surfactant, an inorganic particle, an organic particle, a pigment or the like added thereto in a suitable solvent, and coating this coating solution by the conventional coating means such as a gravure coater, a roll coater and a wire bar, followed by drying.

It is preferable that a thickness of the heat resistant layer is around 0.01 to 3 g/m$^2$ in the dried state.

(Transfer Receiving Material)

As the transfer receiving material used in the present invention, as far as the 60°, 45°, 20° specular reflection of the surface of the transfer receiving material is 30% or greater, there can be used cellulose fiber papers such as synthetic paper (polyolefin series, polystyrene series and the like), fine quality paper, art paper, coated paper, cast coated paper, wall paper, backed paper, synthetic resin or emulsion-impregnated paper, synthetic rubber latex-impregnated paper, synthetic resin-internally added paper, paper board and the like, and various plastic films and sheets such as polyolefin, polystyrene, polycarbonate, polyethylene terephthalate, polyvinyl chloride, polymethacrylate and the like. In addition, white opaque films obtained by adding a white pigment and a filler to these synthetic resins and forming a film, and films having micro voids in the interior of a substrate can be used, being not particularly limited. Alternatively, a laminate derived from an arbitrary combination of the above-mentioned materials may be used, provided that when a receiving layer described later is formed on the surface of the transfer receiving material, the 60°, 45°, 20° specular reflection is 30% or greater on a surface on which a metallic image is formed, including a receiving layer on the transfer receiving material.

Moreover, a so-called pressure-sensitive adhesive label obtained by subjecting aback of a substrate of the above-mentioned transfer receiving material to pressure-sensitive adhesive processing such as provision of a pressure-sensitive adhesive layer and applying to a releasing sheet, may be used as a transfer receiving material.

A thickness of the above mentioned transfer receiving material is around 10 to 200 μm.

On the transfer receiving material in the present invention, a color image and a protecting layer depending on necessity are formed in advance, before a metallic image is formed by a thermal transfer sheet in which at least a resinous peelable layer and a metal thin layer are formed on one surface of the substrate film in this order.

As the transfer receiving material with a color image formed thereon, there can be used a transfer receiving material produced from a thermal transfer image-receiving sheet in which a receiving layer is provided on at least one surface of a substrate, and the color image of the transfer receiving material is formed by selectively and thermally transferring a heat sensitive transferring ink onto the receiving layer of the thermal transfer image-receiving sheet, from a thermal transfer sheet having a heat sensitive transferring ink layer on at least one surface of a substrate film.

Alternatively, there can be used a transfer receiving material with a color image formed thereon produced from a heat sensitive recording medium in which a heat sensitive developing layer is provided on a substrate, and the color image of the transfer receiving material is formed by selectively and heat sensitively developing a heat sensitive recording medium.

Alternatively, there can be used a transfer receiving material with a color image formed thereon produced from an ink jet image-receiving sheet in which an aqueous ink receiving layer is provided on at least one surface of a substrate, and the color image of the transfer receiving material is formed by selectively jetting an aqueous ink to the aqueous ink receiving layer of the ink jet image-receiving sheet.

Alternatively, there can be used a transfer receiving material with a color image formed thereon produced by forming the color image on at least one surface of a substrate by a silver salt photographic system.

Further, there can be used a transfer receiving material with a color image formed thereon produced from an electrophotographic image-receiving sheet in which a receiving layer having the toner fixing property, and the color image of the transfer receiving material is formed by selectively electrically transfer a toner to the receiving layer of an electrophotographic image-receiving sheet, followed by fixing.

A receiving layer to be provided on a transfer receiving material is formed on a transfer receiving material directly or via a primer layer. A receiving layer has a different construction of the layer depending on a difference in respective recording system such as heat sensitive transfer recording such as melting transfer and sublimation transfer, ink jet recording, electrophotographic recording and the like.

In the image displaying medium of the present invention, a color image and a protecting layer are formed on a transfer receiving material in advance and further a resinous peelable layer and a metal thin layer are transferred onto the same surface of the transfer receiving material on which color image and protecting layer are formed and, thus, the image displaying medium has a metallic image. Since the image displaying medium of the present invention requires formation of a color image and, if necessary, formation of a protecting layer and, further, formation of a metallic image, it is preferable to use a thermal transfer recording system image forming method using a thermal head which can practice the above-mentioned three image forming processes with the same image forming printer.

Receiving layers of melting transfer recording and sublimation transfer recording have the function of receiving a coloring material which is transferred from a thermal transfer sheet by heating and, in particular, when a coloring material is a sublimation dye, it is desired that the receiving layers receive and develop the dye and, at the same time, do not allow to re-sublimate the once received dye. This receiving layer is composed mainly of a receiving layer resin. As the receiving layer resin, for example, many resins such as a resin having an ester linkage, a resin having an urethane linkage, a resin having an amide linkage, a resin having an urea linkage, other resins having a highly polar linkage, and a mixture and a copolymer resin of them can be employed. In this receiving layer, organic or inorganic fillers may be added to the above-mentioned resins, if necessary. Further, in the case of sublimation transfer recording, in order to improve the thermal releasability from a thermal transfer sheet, a releasing agent may be added. A thickness of a receiving layer for melting transfer recording and sublimation transfer recording is usually 0.1 to 10 μm at the dried state.

Receiving layers for ink jet recording are roughly classified into two kinds of receiving layers, one mainly composed of a hydrophilic resin, an inorganic fine particle and a filler, and the other mainly composed of a mixture of a water-soluble polymer resin and a water-insoluble polymer resin. In the case of a receiving layer mainly composed of a hydrophilic resin, an inorganic fine particle and a filler, resins which are insoluble in water at least at a normal temperature but have the ink permeability are used as a hydrophilic resin. Examples of such the resin include polyvinyl acetal resins such as polyvinyl acetoacetal and polyvinyl butyral, hydrophilic acrylic resins synthesized from acrylic acid, methacrylic acid or esters thereof, and aqueous polyester resin. In addition, examples of the inorganic fine particle for a receiving layer include white carbon such as anhydrous silicic acid known as colloidal silica, hydrous silcic acid, hydrous calcium silicate and hydrous aluminum silicate, and alumina sol. In addition, examples of the filler for a receiving layer include inorganic particles such as silica, clay, calcium carbonate, barium sulfate, alumina white, aluminum hydroxide, talc, bentonite and titanium oxide, and organic fine particles composed of thermoplastic resins such as vinyl resins such as polymethyl methacrylate, polystyrene and fluorine resin, polyolefin resins such as polyethylene and polypropylene, and polyamide, or thermosetting resins such as polybenzoguanamine resin and urea resin.

In the case of a receiving layer for ink jet recording mainly composed of a mixture of a water-soluble polymer resin and a water-insoluble polymer resin, polymers which are soluble in water at a normal temperature are used as a water-soluble polymer resin. As such the resin, for example, there can be preferably used water-soluble polymers such as polyacrylic acid, polymethacrylic acid or ester, salts and copolymer thereof, polyhydroxyethyl methacrylate and copolymer thereof, starches, polyvinylpyrrolidone, polyvinyl alcohol, polyethylene glycol, and cellulose derivatives such as methylcellulose and hydroxyethylcellulose. In addition, a water-insoluble polymer resin means a polymer which is insoluble in water at a normal temperature after formation of a film, and there is no problem that the polymer resin is swollen in water at a normal temperature. The water-insoluble polymer resin exerts the action of fixing the water-soluble polymer resin so as not to flow, and prevents uneven distribution of the water-soluble polymer resin in a film of an ink. The water-insoluble polymer resin is a water dispersion type. Alternatively, a water-insoluble polymer resin may be an alcohol soluble polymer resin. Examples thereof include water dispersion type polyester copolymer, water dispersion type acrylic copolymer, water dispersion type polyurethane, methoxymethylated nylon resin, and cellulose esters and the like.

A thickness of the above-mentioned receiving layers for ink jet recording which are roughly classified into two kinds are 1 to 50 μm, preferably 5 to 25 μm in both cases.

In electrophotographic recording, examples of a resin for forming a receiving layer include polyolefin resins such as polyethylene, polypropylene, polyvinyl chloride, polyvinylidene chloride, polyvinyl acetate, vinyl chloride/vinyl acetate copolymer, polyacrylic acid ester, polyethylene terephthalate, polybutylene terephthalate, polystyrene resin, polyamide resin, copolymers prepared by olefin such as ethylene and propylene with other vinyl monomers, ionomer, cellulose resins such as ethylcellulose, cellulose acetate, polycarbonate resin, and the like. Particularly preferred are vinyl resin, polyester resin, and vinyl chloride/vinyl acetate copolymer resin. A thickness of a receiving layer is usually 0.1 to 10 μm in the dried state.

When a transfer receiving material with a color image formed thereon is produced from a heat sensitive recording medium in which a heat sensitive developing layer is provided on a substrate, and the color image of the transfer receiving material is formed by selectively and heat sensitively developing a heat sensitive recording medium, for example, a heat sensitive photosensitive recording system TA (Thermo Autochrome) paper supplied by Fuji Photo Film Co., Ltd. can be used. This is to suppress contact of the materials inside a capsule with a developer and an organic basic compound ready outside a capsule, that is, to control a reaction of a dye precursor to control formation of a dye by controlling a heat responsive capsule containing a diazonium salt as a dye precursor therein by heat. Then, by irradiating with ultraviolet-ray, the dye precursor is decomposed, and reacted with a coupler so as to prohibit development, whereby, fixing is conducted. A heat responsive capsule and a diazonium salt are devised in order to obtain a full color image.

It is preferable that a protecting layer is formed on a transfer receiving material used in the present invention. This protecting layer is provided on the color image explained above to improve the durability such as resistance to scuffing of the color image. It is preferable that this protecting layer is formed by thermally transferring a transparent resin layer onto an image from a thermal transfer sheet having a heat sensitive transferring transparent resin layer on at least one surface of a substrate.

As a resin constituting the protecting layer, there can be exemplified a polyolefin resin, a polystyrene resin, an acrylic resin, a vinyl chloride-vinyl acetate copolymer resin, a polyester resin, a polyurethane resin, and an acrylurethane resin and resins obtained by silicone-modifying those respective resins, a mixture of these respective resins, an ionizing radiation curing resin, an ultraviolet-ray shielding resin and the like.

A protecting layer containing an ultraviolet-ray shielding resin can impart, in particular, the weather resistance to an image-formed product. As the ultraviolet-ray shielding resin, for example, there can be used a resin obtained by reacting a reactive ultraviolet-ray absorbing agent with a thermoplastic resin or the above-mentioned ionizing radiation curing resin, followed by bonding. As the reactive ultraviolet-ray absorbing agent, more specifically, there can be exemplified resins in which a reactive group such as addition polymerizing double bond (e.g. vinyl group, acryloyl group, methacryloyl group), alcoholic hydroxyl group, amino group, carboxyl group, epoxy group and isocyanate group is introduced into the previously known non-reactive organic ultraviolet-ray absorbing agent such as salicylates, benzophenones, benzotriazoles, substituted acrylonitriles, nickel chelates, and hindered amines.

Among the foregoing, for forming the protecting layers, it is desirable to mainly use a thermoplastic resin having a glass transition temperature of 60 to 150° C. from a viewpoint of the transfer property onto a transfer receiving material, and the durability such as resistance to scuffing as a protecting layer. The protecting layer is usually formed into a thickness of around 0.5 to 10 μm, depending on a kind of a resin for forming the protecting layer.

As explained above, according to the present invention, there can be obtained an image displaying medium with a metallic image, which comprises a metallic image formed on a transfer receiving material with a color image formed thereon, wherein the metallic image is formed by using a thermal transfer sheet in which at least a resinous peelable layer and a metal thin layer are provided on one surface of a substrate film in this order, the resinous peelable layer comprising a pigment and a thermoplastic resin having a glass transition temperature of 60° C. or higher and the metal thin layer comprising a composition containing an aluminum pigment prepared by forming an aluminum film by deposition on a carrier sheet with a releasing layer provided thereon, and peeling the aluminum film from the carrier sheet to finely divide it, and a binder of a thermoplastic resin having a glass transition temperature of 50 to 150° C., and the 60°, 45°, 20° specular reflection of the image surface on which the metallic image is formed is 100% or greater according to JIS Z8741, and a brightness (L*value) is 20 or greater and, thus, there can be obtained a printed product having an on-demand metallic color image which has a high luminance and high brightness and is excellent in the resistance to scuffing.

EXAMPLES

The present invention will be explained more specifically by way of examples. In the description, part and % are in terms of mass unless otherwise stated.

Example 1

A resinous peelable coating solution having the following composition was coated on one surface of a polyethylene terephthalate film having a thickness of 6.0 μm as a substrate film at a dry coated amount of 0.5 g/m$^2$ by gravure coating, followed by drying, to form a resinous peelable layer. Further, on the resinous peelable layer, a metal thin layer coating solution having the following composition was coated at a dry coated amount of 0.5 gm/$^2$ by gravure coating, followed by draying, to form a metal thin layer to obtain a thermal transfer sheet.

A heat resistant layer coating solution was coated on the other surface of the above-mentioned substrate film at a dry coated amount of 0.3 g/m$^2$ by gravure coating, followed by drying, to form a heat resistant layer in advance.

| <Resinous peelable layer coating solution> | |
|---|---|
| Red pigment (Pigment Red 122) | 5 parts |
| Acrylic resin (manufactured by Mitsubishi Rayon Co., Ltd., trade name: BR-87) | 10 parts |
| Vinyl chloride/vinyl acetate copolymer resin | 10 parts |
| Dispersing agent | 0.5 part |
| Toluene | 35 parts |
| Methyl ethyl ketone | 35 parts |

| <Metal thin film coating solution> | |
|---|---|
| Leaf-shaped aluminum powder (manufactured by AVERY DENNISON, trade name: Metalure) | 4 parts |
| Acrylic resin (manufactured by Mitsubishi Rayon Co., Ltd., trade name: BR-75) | 6 parts |
| Ethyl acetate | 40 parts |
| Isopropyl alcohol | 40 parts |
| Toluene | 10 parts |

| <Heat resistant coating solution> | |
|---|---|
| Styrene/acrylonitrile copolymer resin | 11 parts |
| Linear saturated polyester resin | 0.3 part |
| Zinc stearyl phosphate | 6 parts |
| Melamine resin powder | 3 parts |
| Methyl ethyl ketone | 80 parts |

For a transfer receiving material, a white polyethylene terephthalate film having a thickness of 125 μm was used as a film substrate and, on one surface thereof, was coated a receiving layer coating solution having the following composition at a dry coated amount of 3.0 g/m$^2$ by gravure coating, followed by drying, to form a receiving layer.

The 60°, 45°, 20° specular reflection of the surface of the resulting transfer receiving material was 30% or greater according to JIS Z8741.

| <Receiving layer coating solution> | |
|---|---|
| Vinyl chloride/vinyl acetate copolymer resin | 30 parts |
| Silicone oil | 1.5 parts |
| Toluene | 35 parts |
| Methyl ethyl ketone | 35 parts |

A full color image was formed on the transfer receiving material on which a receiving layer was provided as described above with a sublimation-type thermal transfer printer having a thermal head using a thermal transfer sheet for sublimation transfer having respective dye layers of yellow, magenta and cyan.

Separately, the heat resistant layer coating solution used above was coated on one surface of a substrate film of a polyethylene terephthalate film having a thickness of 4.5 μm at a dry coated amount of 0.3 g/m$^2$ by gravure coating, followed by drying, to form a heat resistant layer. On the other surface of the substrate film, a releasing layer having the following composition was coated at a dry coated amount of 1.0 g/m$^2$ by gravure coating, followed by drying, to form a releasing layer and, on the releasing layer, a resin protecting coating solution having the following composition was further coated at a dry coated amount of 1.0 g/m$^2$ by gravure coating, followed by drying, to form a protecting layer.

| <Releasing layer coating solution> | |
|---|---|
| Vinyl chloride/vinyl acetate copolymer resin | 15 parts |
| Silicone-modified acrylic resin | 15 parts |
| Toluene | 35 parts |
| Methyl ethyl ketone | 35 parts |

| <Resin protecting coating solution> | |
|---|---|
| Acrylic resin | 30 parts |
| Toluene | 35 parts |
| Methyl ethyl ketone | 35 parts |

Using the thermal transfer sheet on which the thus prepared protecting layer was provided, a protecting layer was thermally transferred onto the whole color image of a transfer receiving material on which a color image had been formed in advance, using the same thermal transfer printer as that described above.

Then, onto the above mentioned transfer receiving material on which a color image and a protecting layer were formed, a metallic image was transferred including onto the color image, with the same thermal transfer printer as that described above, using the thermal transfer sheet having a metal thin layer prepared as described above.

As a result, an on-demand image displaying medium having a pink metallic color image having a high luminance and a high brightness could be obtained. The 60°, 45°, 20° specular reflection of the image surface of this image displaying medium on which a metallic image was formed was 100% or greater according to JIS Z8741, and a brightness (L*value) was 20 or greater.

Detailed data of the 60°, 45°, 20° specular reflection and brightness (L*value) are shown in Table 1.

Example 2

According to the same manner as that of Example 1 except that the resinous peelable layer used in Example 1 was change into the following composition, the coating solution was coated at a dry coated amount of 0.5 g/m$^2$ by gravure coating, and an adhesive layer having the following composition was coated and formed on a metal thin layer at a dry coated amount of 0.3 g/m$^2$ by gravure coating, a thermal transfer sheet was prepared.

| <Resinous peelable layer coating solution> | |
|---|---|
| Blue pigment (Pigment blue 15:6) | 5 parts |
| Acrylic resin (manufactured by Mitsubishi Rayon Co., Ltd., trade name: BR-87) | 10 parts |
| Vinyl chloride/vinyl acetate copolymer resin | 10 parts |
| Dispersing agent | 0.5 part |
| Toluene | 35 parts |
| Methyl ethyl ketone | 35 parts |

| <Adhesive layer coating solution> | |
|---|---|
| Polyester resin (manufactured by Toyobo Co., Ltd. trade name: Vyron 700) | 30 parts |
| Toluene | 35 parts |
| Methyl ethyl ketone | 35 parts |

Using the thermal transfer sheet prepared as described above and the transfer receiving material on which a color image and a resin protective layer were formed used in Example 1, a metallic image was transferred onto a transfer receiving material, including onto a color image, as is the case with Example 1.

As a result, an on-demand image displaying medium having a blue metallic color image having a high luminance and a high brightness could be obtained. The 60°, 45°, 20° specular reflection of the image surface of this image displaying medium on which a metallic image was formed was 100% or greater according to JIS Z8741, and a brightness (L*value) was 20 or greater.

Detailed data of the 60°, 45°, 20° specular reflection and brightness (L*value) are shown in Table 1.

Comparative Example 1

A resinous peelable coating solution having the following composition was coated on the same substrate film with a heat resistant layer used in Example 1 at a dry coated amount of 0.5 g/m$^2$ by gravure coating, followed by drying, to form a resinous peelable layer. Further, on the resinous peelable layer, a metal thin layer was formed of an aluminum-deposited layer having a thickness of 350 Å by a vacuum deposition method. Then, on the metal thin layer, the same adhesive coating solution as that of Example 2 was coated at a dry coated amount of 0.3 g/m$^2$ by gravure coating, followed by drying, to form an adhesive layer to prepare a thermal transfer sheet.

| <Resinous peelable layer coating solution> | |
|---|---|
| Red pigment | 3 parts |
| Acrylic resin (manufactured by Mitsubishi Rayon Co., Ltd., trade name: BR-87) | 30 parts |
| Toluene | 30 parts |
| Methyl ethyl ketone | 30 parts |

Using the thermal transfer sheet prepared as described above, and the transfer receiving material on which a color image and a protecting layer were formed used in Example 1, a metallic image was transferred onto a transfer receiving material, including onto a color image, as is the case with Example 1.

As a result, an image displaying medium was obtained which had a high luminance, but had an on-demand red metallic color image having dark impression depending on visual angle. The 60°, 45°, 20° specular reflection of the image surface of this image displaying medium on which a metallic image was formed was 100% or greater according to JIS J8741, but a brightness (L*value) was 3. Detailed data of the 60°, 45°, 20° specular reflection and the brightness (L*value) are shown in Table 1.

The 60°, 45°, 20° specular reflection and the brightness (L*value) in the image displaying medium with a metallic image in respective Examples and Comparative Example were measured under the following conditions:

* Specular Reflection

GLOSS METER VGS-1001DP (according to JIS-Z8741 (1983)) manufactured by Nippon Denshoku Industries Co., Ltd.

* Brightness (L*Value)

Color and color difference meter CR-221 (according to 45-0 method defined in JIS-Z8722) manufactured by MINOLTA Co., Ltd.

TABLE 1

| | Reflection (%) | | | Brightness |
|---|---|---|---|---|
| | 60° | 45° | 20° | (L* value) |
| Image-receiving sheet | 75 | 81 | 49 | — |
| Embodiment 1 | 285 | 225 | 175 | 37.1 |
| Embodiment 2 | 146 | 111 | 129 | 24.4 |
| Comparative example 1 | *600 or grater | *600 or grater | *600 or grater | 2.4 |

*Luster (%) of Comparative Example was outside a measurable range due to too high luminance.

The invention claimed is:

1. A method of forming an image displaying medium with a metallic image comprising steps of:

providing a transfer receiving material having a color image thereon, providing a thermal transfer sheet in which at least a resinous peelable layer and a metal thin layer are provided on one surface of a substrate film in this order, wherein the resinous peelable layer comprises a pigment and a thermoplastic resin having a glass transition temperature of 60° C. or higher, and the metal thin layer comprises a composition containing an aluminum pigment having a deposited thickness of 0.01 to 0.1 μm, an average particle short diameter of 0.01 to 0.2 μm and an average long diameter of 1 to 100 μm, prepared by forming an aluminum film by deposition on a carrier sheet with a releasing layer provided thereon and peeling the aluminum film from the carrier sheet to finely divide it, and a binder of a thermoplastic resin having a glass transition temperature of 50 to 150° C., forming a metallic image by thermally transferring the thermal transfer sheet onto the color image of the transfer receiving material.

2. The method of forming an image displaying medium with a metallic image according to claim 1, wherein the thermal transfer sheet is further provided with a heat resistant layer on an other surface of the substrate film.

3. The method of forming an image displaying medium with a metallic image according to claim 1, wherein a 60°, 45°, 20° specular reflection of the surface of the transfer receiving material is 30% or greater.

4. The method of forming an image displaying medium with a metallic image according to claim 1, further comprising, forming a protecting layer on the transfer receiving material with a color image formed thereon before forming the metallic image, by thermally transferring a heat sensitive transferring transparent resin layer comprising a thermoplastic resin having a glass transition temperature of 60 to 150° C. onto the whole image from a thermal transfer sheet in which the heat sensitive transferring transparent resin layer is originally provided on at least one surface of a substrate, thereby forming a protecting layer between the metallic image and the color image.

5. The method of forming an image displaying medium with a metallic image according to claim 1, wherein the transfer receiving material with a color image formed thereon is produced from a thermal transfer image-receiving sheet in which a receiving layer is provided on at least one surface of a substrate, and the color image of the transfer receiving material is formed by selectively and thermally transferring a heat sensitive transferring ink onto the receiving layer of the thermal transfer image-receiving sheet, from a thermal transfer sheet having a heat sensitive transferring ink layer on at least one surface of a substrate film.

6. The method of forming an image displaying medium with a metallic image according to claim 1, wherein the transfer receiving material with a color image formed thereon is produced from a heat sensitive recording medium in which a heat sensitive developing layer is provided on a substrate, and the color image of the transfer receiving material is formed by selectively and heat sensitively developing a heat sensitive recording medium.

7. The method of forming an image displaying medium with a metallic image according to claim 1, wherein the transfer receiving material with a color image formed thereon is produced from an ink jet image-receiving sheet in which an aqueous ink receiving layer is provided on at least one surface of a substrate, and the color image of the transfer receiving material is formed by selectively jetting an aqueous ink to the aqueous ink receiving layer of the ink jet image-receiving sheet.

8. The method of forming an image displaying medium with a metallic image according to claim 1, wherein the transfer receiving material with a color image formed thereon is produced by forming the color image on at least one surface of a substrate by a silver salt photographic system.

9. The method of forming an image displaying medium with a metallic image according to claim 1, wherein the transfer receiving material with a color image formed thereon is produced from an electrophotographic image-receiving sheet in which a receiving layer having the toner fixing property, and the color image of the transfer receiving material is formed by selectively transfer a toner to the receiving layer of an electrophotographic image-receiving sheet, followed by fixing.

10. The method of forming an image displaying medium with a metallic image according to claim 1, wherein the transfer receiving material with a color image formed thereon is a pressure-sensitive adhesive label in which a pressure-sensitive adhesive layer and a release sheet are successively provided on the surface opposite to a surface on which a color image is formed.

* * * * *